(12) United States Patent
Talyansky et al.

(10) Patent No.: US 9,139,768 B2
(45) Date of Patent: Sep. 22, 2015

(54) VARIABLE DATA PRINTING FOR SECURITY PURPOSES USING CERAMIC SUB-MICRON INFRARED-LUMINESCENT PARTICLES IN INKJET INK

(71) Applicants: Vitaly Talyansky, Portland, OR (US); Edward Talyanaksy, Battle Ground, WA (US); Jose Gasque, Vancouver, WA (US)

(72) Inventors: Vitaly Talyansky, Portland, OR (US); Edward Talyanaksy, Battle Ground, WA (US); Jose Gasque, Vancouver, WA (US)

(73) Assignee: Stardust Materials, LLC, Vancouver, WA (US)

( * ) Notice: Subject to any disclaimer, the term of this patent is extended or adjusted under 35 U.S.C. 154(b) by 0 days.

(21) Appl. No.: 14/177,642

(22) Filed: Feb. 11, 2014

(65) Prior Publication Data

US 2015/0225643 A1     Aug. 13, 2015

(51) Int. Cl.
*G01D 11/00* (2006.01)
*C09K 11/77* (2006.01)
*B41J 2/00* (2006.01)

(52) U.S. Cl.
CPC ... *C09K 11/77* (2013.01); *B41J 2/00* (2013.01)

(58) Field of Classification Search
CPC .... B42D 2033/20; B42D 25/00; B42D 25/29; C09D 11/38; C09D 11/52
USPC ....... 347/54, 73, 95, 100; 428/32.69
See application file for complete search history.

(56) References Cited

U.S. PATENT DOCUMENTS 7,829,162 B2 * 11/2010 Eskra et al. ................ 428/32.69

* cited by examiner

*Primary Examiner* — An Do

(57) ABSTRACT

Methods and apparatus for variable data printing for security purposes using ceramic sub-micron infrared-luminescent particles in inkjet ink. An example apparatus includes an inkjet printer containing marked ink, the marked ink containing particles consisting of rare earth doped ceramics, wherein the particles are less than one micron in size, the particles are suspended in the marked ink, and the particles have luminescent properties such that when the particles are illuminated by first electromagnetic radiation having a first wavelength, the particles emit infrared light having a peak wavelength at a second wavelength.

19 Claims, 3 Drawing Sheets

VARIABLE DATA PRINTING FOR SECURITY PURPOSES USING CERAMIC SUB-MICRON INFRARED-LUMINESCENT PARTICLES IN INKJET INK

FIELD OF THE DISCLOSURE

The present disclosure relates generally to product authentication and, more particularly, to variable data printing for security purposes using ceramic sub-micron infrared-luminescent particles in inkjet ink.

BACKGROUND

A printer can print documents with marked ink. Documents printed with the marked ink can later be authenticated by detecting the marked ink.

DETAILED DESCRIPTION

Counterfeit products can cause significant economic and other damage to both the purveyor of authentic non-counterfeit products and the consumer of the counterfeit products. Counterfeit documents can likewise cause economic and/or other damage. One method to prevent counterfeiting of products and/or documents is to print a document or to print the packaging and/or labeling for a product or to print a marking on the product using special ink that can later be authenticated. Counterfeit products will not have this special ink and therefore cannot be authenticated.

One type of special ink that can be used for authentication is ink that contains sub-micron particles that have luminescent properties. When this ink is printed onto a document or product, the sub-micron particles are transferred to the document or product. The document or product can then be authenticated by illuminating the printed ink on the document or product with electromagnetic radiation at a wavelength that causes the sub-micron particles to luminesce and then detecting that luminescence. Documents and/or products that are not authentic will not have the sub-micron particles and thus will not luminesce.

Example methods, apparatus, and/or articles of manufacture disclosed herein provide a method of authenticating documents and/or products using inorganic ceramic sub-micron particles that are suspended in inkjet ink by polymeric or electrostatic stabilization. In examples disclosed herein, the inorganic ceramic sub-micron particles have luminescent properties such that when illuminated by infrared or visible light at a particular wavelength, they emit infrared light at another wavelength. In examples disclosed herein, the sub-micron particles are dispersed homogeneously throughout the ink such that when the ink is printed onto a document or product using an inkjet printer, the sub-micron particles are transferred to the document or product as well. In examples disclosed herein, documents, products, product packaging and/or product labeling that are printed using the ink with sub-micron particles can be authenticated by illuminating them with light that has the appropriate wavelength to cause the sub-micron particles in the ink to luminesce. In examples disclosed herein, this luminescence is detected to authenticate the document and/or product.

Figure 1:
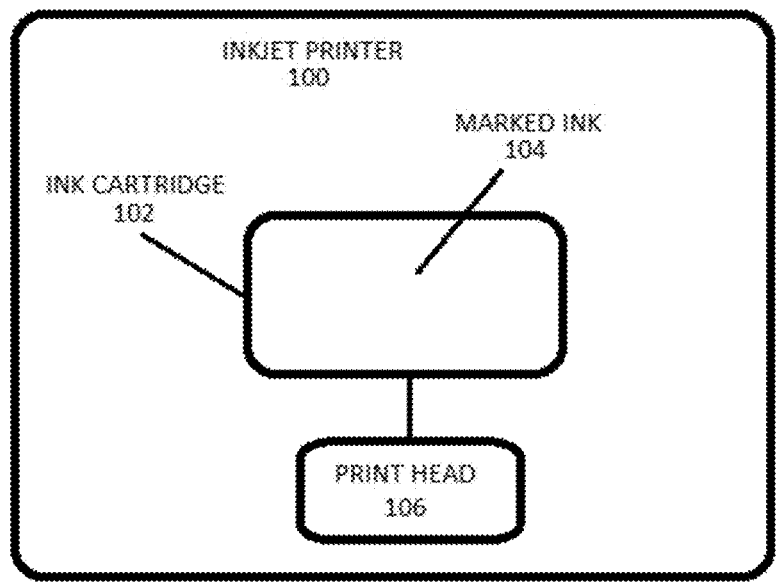
FIG. 1 is a block diagram of a printing system in accordance with the teachings of this disclosure.

FIG. 1 is a block diagram of an example printing system for variable data security using ceramic sub-micron particles in inkjet ink. The example of FIG. 1 includes an inkjet printer 100, an ink cartridge 102, marked ink 104 and a print head 106.

The inkjet printer 100 of FIG. 1 is a standard commercially available inkjet printer that prints documents and/or prints directly onto products using inkjet. The inkjet printer 100 of FIG. 1 may be a drop-on-demand printer or a continuous inkjet printer. The example inkjet printer 100 contains one or more ink cartridges 102. In examples in which the inkjet printer 100 contains multiple ink cartridges 102, each ink cartridge may contain ink of a different color. The example ink cartridge 102 of FIG. 1 is a standard commercially available ink cartridge to be used with the example inkjet printer 100. The example ink cartridge 102 contains marked ink 104. The example marked ink 104 contains ceramic sub-micron particles as discussed more fully in connection with FIG. 2. The example print head 106 takes example marked ink 104 from the example ink cartridge 102 and prints text and/or other markings or symbols onto paper and/or products as specified by a user of the example inkjet printer 100. The example print head 106 transfers the example marked ink 104 onto the paper or product being printed. Because the example inkjet printer 100 is a standard commercially available printer, a user of the printer can specify any variable data to print as a security feature (e.g., one or more characters and/or images). Ink some examples, the inkjet printer 100 is replaced with a standard commercially available laser printer and the marked ink 104 is replaced with marked toner.

Figure 2:
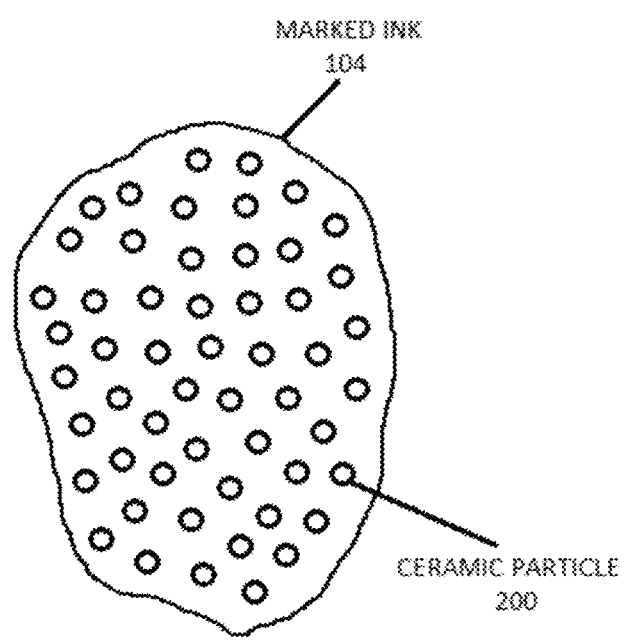
FIG. 2 is a diagram of example marked ink in accordance with the teachings of this disclosure.

FIG. 2 is a block diagram of the example marked ink 104 of FIG. 1. A volume of example marked ink 104 is illustrated in FIG. 2. The example marked ink 104 of FIG. 2 contains ceramic particles 200. In the illustrated example, the ceramic particles 200 consist of inorganic rare earth doped ceramics. These inorganic ceramic particles are highly durable so as to survive the milling process described below and they are light fast. In the illustrated example, the ceramic particles 200 are milled down to an appropriate size from ceramic powder in a solvent using known milling techniques. In the illustrated example, the example ceramic sub-micron particles 200 are milled to as small a size as possible, typically around 200 nanometers in mean size, but they must be less than one micron in size. If the size of the example ceramic particles 200 is greater than one micron, the example inkjet printer 100 will not be able to print properly using the example marked ink 104 because the large particles in the marked ink 104 will cause the example print head 106 to clog. In addition, the example ceramic particles 200 must be milled to a small enough size such that they are light enough to be suspended in the example marked ink 104 as described below.

In the illustrated example, the ceramic nanoparticles 200 have luminescent properties such that when the ceramic nanoparticles 200 are illuminated with infrared or visible light at a particular first wavelength L1, the ceramic nanoparticles 200 emit infrared light with a peak wavelength at a second wavelength L2. When the example print head 106 prints the example marked ink 104 onto a document or product, the example ceramic particles 200 are transferred to the document or product along with the ink. Thus, the markings printed on the document or product by the example inkjet printer 100 will luminesce and emit light with wavelength L2 when illuminated by light with wavelength L1. This allows the printed markings to be used as a security feature by testing the markings for luminescence. If the security markings on a document or product do not luminesce when they are illuminated by light with the appropriate wavelength, then the document or product is not authentic.

The example ceramic particles 200 are dispersed and suspended in the marked ink 104. In order for the example inkjet printer 100 to transfer the example ceramic particles 200 to a document or product when printing, the ceramic particles 200 must be dispersed equally throughout the example marked ink 104. In the illustrated example, this is accomplished by suspending the ceramic particles 200 in the marked ink 104 using steric stabilization, as discussed more fully in connection with FIG. 3. In other examples, the ceramic particles 200 are suspended in the marked ink 104 using electrostatic stabilization. In examples where the inkjet printer 100 is replaced with a laser printer, the ceramic particles 200 are dispersed and suspended in toner.

If the example ceramic particles 200 are not stabilized in the example marked ink 104, the ceramic particles 200 tend to coalesce together in certain areas of the marked ink 104 leaving other areas of the marked ink 104 with little or no ceramic particles 200. If this happens, then the example inkjet printer 100 will not transfer the example ceramic particles 200 equally to a document or product while printing and markings on the printed document or product may not luminesce as expected. One way to stabilize the example ceramic particles 200 in the example marked ink 104 is with steric stabilization.

Figure 3:
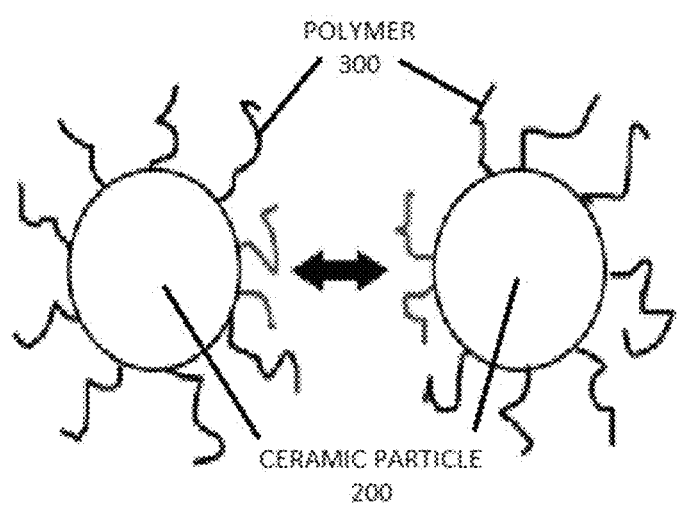
FIG. 3 is a diagram of example ceramic particles in accordance with the teachings of this disclosure.

Two example ceramic particles 200 that are stabilized in the example marked ink 104 using steric stabilization are illustrated in FIG. 3. In the illustrated example, the ceramic particles 200 are positively charged. In the illustrated example, polymers 300 are added to the ceramic particles 200 during the milling process. One end of the example polymers 300 is negatively charged and the other end of the polymers 300 is neutral or positively charged. The negatively charged end of each of the example polymers 300 is attracted to the positively charged ceramic particles 200. This attraction causes the negatively charged ends of the example polymers 300 to attach to the example ceramic particles 200 as illustrated in FIG. 3. After the example polymers 300 attach to the example ceramic particles 200, the ends of the polymers 300 not attached to the ceramic particles 200 repel the polymers 300 attached to other ceramic particles 200. In examples where the ends of the polymers 300 are positively charged, they repel each other through this like charge. In examples where the ends of the polymers 300 are neutrally charged, they physically repel each other. This repelling feature by the example polymers 300 on the example ceramic particles 200 causes the ceramic particles 200 to be equally dispersed throughout the example marked ink 104. In some examples, the ceramic particles 200 are negatively charged and a positively charged end of each of the polymers 300 is attracted to and attaches to a negatively charged ceramic particle 200. In some examples, the polymers 300 are added to the ceramic particles 200 after the ceramic particles 200 are milled.

In some examples, the ceramic particles 200 are stabilized in the marked ink 104 using electrostatic stabilization. In these examples, negatively charged ions are added to the positively charged ceramic particles 200 during the milling process. The negatively charged ions are attracted to the positively charged ceramic particles 200. This attraction causes the negatively charged ions to attach to the ceramic particles 200. Once the negatively charged ions attach to the ceramic particles 200, the outside of each of the ceramic particles 200 is negatively charged. This negative charge on the outside of the ceramic particles 200 causes all of the ceramic particles 200 to repel each other. This causes the ceramic particles 200 to be equally dispersed throughout the marked ink 104. In some examples, the ceramic particles 200 are negatively charged and positively charged ions are added to and are attracted to and attach to the negatively charged ceramic particles 200. In some examples, ions are added to the ceramic particles 200 after the milling process. In some examples, the ceramic particles 200 are suspended in the marked ink 104 using other techniques such as with ionic or nonionic surfactants.

After the example ceramic particles 200 are suspended in the example marked ink 104, the marked ink 104 can be used in the example ink cartridge 102 in the example inkjet printer 100. The example inkjet printer 100 prints documents and/or prints directly onto products using the example print head 106 which causes the example marked ink 104 to transfer to the documents and/or products along with the example ceramic particles 200. The example inkjet printer 100 allows a user to print variable data of any type onto documents and/or products.

Whatever markings are printed onto the documents and/or products will be printed with the example marked ink 104 containing the example ceramic particles 200. Therefore, any markings printed by the example inkjet printer 100 will have the luminescent properties of the example ceramic particles 200 such that when the markings are illuminated with infrared or visible light of the appropriate wavelength, the markings will emit infrared light with a peak known wavelength, where the specific wavelength of the emission will depend on the properties of the ceramic particles 200. Thus, markings printed by the example inkjet printer 100 can be used as a security feature on documents and/or products. Documents and/or products can be authenticated by illuminating security markings and detecting whether or not a luminescent response is produced. If a luminescent response is not produced, then the document or product being tested is not authentic.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. An apparatus comprising:
an inkjet printer containing marked ink, the marked ink containing inorganic particles consisting of rare earth doped ceramics, wherein the particles are less than one micron in size, the particles are suspended in the marked ink, and the particles have luminescent properties such that when the particles are illuminated by first electromagnetic radiation having a first wavelength, the particles emit infrared light having a peak wavelength at a second wavelength.

2. The apparatus of claim 1, wherein the inkjet printer is a drop-on-demand printer.

3. The apparatus of claim 1, wherein the inkjet printer is a continuous inkjet printer.

4. The apparatus of claim 1, wherein the first electromagnetic radiation is infrared light.

5. The apparatus of claim 1, wherein the first electromagnetic radiation is visible light.

6. The apparatus of claim 1, wherein the particles are suspended in the marked ink by steric stabilization.

7. The apparatus of claim 1, wherein the particles are suspended in the marked ink by electrostatic stabilization.

8. A method comprising:
milling ceramic powder into a solvent to produce inorganic ceramic particles with a size of less than one micron, wherein the ceramic powder consists of rare earth doped ceramics and wherein the ceramic particles have luminescent properties such that when the ceramic particles are illuminated with first electromagnetic radiation having a first wavelength, the ceramic powder emits infrared light having a second wavelength.

9. The method of claim 8, wherein the first electromagnetic radiation is infrared light.

10. The method of claim 8, wherein the first electromagnetic radiation is visible light.

11. The method of claim 8, further comprising milling the ceramic powder with polymers such that the ceramic particles are sterically stabilized in suspension.

12. The method of claim 8, further comprising adding polymers to the ceramic particles such that the ceramic particles are sterically stabilized in suspension.

13. The method of claim 8, further comprising milling the ceramic powder with ions such that the ceramic particles are electrostatically stabilized in suspension.

14. The method of claim 8, further comprising adding ions to the ceramic particles such that the ceramic particles are electrostatically stabilized in suspension.

15. An apparatus comprising:
A laser printer containing marked toner, the marked toner containing inorganic particles consisting of rare earth doped ceramics, wherein the particles are less than one micron in size, the particles are suspended in the marked toner, and the particles have luminescent properties such that when the particles are illuminated by first electromagnetic radiation having a first wavelength, the particles emit infrared light having a peak wavelength at a second wavelength.

16. The apparatus of claim 15, wherein the first electromagnetic radiation is infrared light.

17. The apparatus of claim 15, wherein the first electromagnetic radiation is visible light.

18. The apparatus of claim 15, wherein the particles are suspended in the marked toner by steric stabilization.

19. The apparatus of claim 15, wherein the particles are suspended in the marked toner by electrostatic stabilization.

* * * * *